Patented Feb. 14, 1939

2,146,902

UNITED STATES PATENT OFFICE 2,146,902

METHOD OF TREATING PEAT

William Martin, Vancouver, British Columbia, Canada

No Drawing. Application October 11, 1937, Serial No. 168,520. In Canada August 30, 1937

3 Claims. (Cl. 44—27)

This invention relates to an improved method of treating peat for marketing purposes.

An object of the present invention is the provision of an improved method of treating peat by means of which the peat may be marketed much more cheaply than heretofore.

Another object is the provision of a method of producing very finely ground peat.

A further object is the provision of a method of treating peat whereby its volume may be substantially reduced for handling and shipping in its wet state.

Heretofore very little peat has been handled or shipped in its moist state because of its relatively great volume and weight due to its large water content. It has been found that very little of the water could be removed from the peat by pressing and, consequently, its volume could be reduced but very little by this means. The present method of treating peat makes it possible to remove a large percentage of water by pressing, thereby greatly reducing its volume so that the peat may be handled and shipped economically in its wet state.

Another difficulty experienced at present with peat is that it must be thoroughly dried before it can be ground and even then it cannot be ground very finely. The peat may be ground to a very fine powder by this method without the necessity of drying it, and, if desired, it may be dried after the grinding operation. In this way a much more finely ground peat is produced at considerably less expense.

At the present time, the peat is cut by hand into blocks and piled out in the open for drying for a period of from three to six months. Then the peat is moved into sheds where it is piled and allowed to dry for a further period of approximately six months. Finally the dried peat is ground as finely as possible by suitable grinding machinery. This dried peat, however, is so tough that a great deal of power is necessary for the grinding operation and even then it cannot be ground very finely owing to its fibrous nature.

When obtaining peat for this treatment it does not have to be cut into blocks so that it may be excavated in large quantities by mechanical means instead of manually. The wet peat is then frozen, preferably to a temperature sufficiently low to make it brittle. Next, the frozen peat is ground up very finely in any suitable manner. One way of doing this is to press the frozen peat against a revolving grind stone. After the grinding, the particles are allowed to melt after which the peat is pressed to remove a large percentage of the water contained therein. This wet peat may be pressed into bales for handling and shipping or, if desired, it may be dried. The product resulting from the drying is a very finely ground or pulverized peat.

The freezing of the peat breaks down its cells so that it liberates a large percentage of its water when pressed. The peat may be compressed after being ground, considerably more than is now possible since a greater portion of the water is removed and since a finely ground material can be compressed into a much smaller space than coarse, fibrous particles.

Peat treated in this manner can be produced much more cheaply than heretofore because it can be treated as soon as it is excavated and made ready for shipment or use within a few hours. As stated above, at present the peat is handled several times over a period of many months before it is ready to be ground. Frozen peat may be ground much finer than the coarse, fibrous peat and, at the same time, considerably less power is required as the brittle, frozen peat is much easier to grind than the dry fibrous peat.

By being able to produce peat much more cheaply than at present and by being able to reduce the handling and shipping charges, this industry will be stimulated owing to the fact that new fields will be opened to the use of peat where it has always been barred owing to the high cost of obtaining the same.

While this method has been described in connection with peat, it will be understood that, if desired, it may be used with any other materials.

Various modifications may be made in the invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim as my invention is:

1. The method of treating peat or the like which comprises freezing the peat, grinding the peat in its frozen state, throwing out said peat, and pressing the peat to remove a large percentage of the water contained therein.

2. The method of treating peat or the like which comprises freezing the peat, grinding the peat in its frozen state, thawing out said peat, pressing the peat to remove a large percentage of the water contained therein and drying said peat to produce a finely ground, dry peat.

3. The method of treating peat or the like which comprises freezing the peat in a body to a temperature sufficiently low to make it brittle, grinding the peat in its frozen state, pressing the peat to remove a large percentage of the water contained therein and compressing the peat into bales for shipment.

WILLIAM MARTIN.